(12) United States Patent
Baney et al.

(10) Patent No.: US 8,731,133 B2
(45) Date of Patent: May 20, 2014

(54) NUCLEAR REACTOR HAVING EFFICIENT AND HIGHLY STABLE THERMAL TRANSFER FLUID

(75) Inventors: Ronald H. Baney, Gainsville, FL (US);
James S. Tulenko, Gainsville, FL (US);
Kevin W. Powers, Gainsville, FL (US)

(73) Assignee: University of Florida Research Institute Foundation, Inc., Gainesville, FL (US)

( * ) Notice: Subject to any disclaimer, the term of this patent is extended or adjusted under 35 U.S.C. 154(b) by 1618 days.

(21) Appl. No.: 12/280,286

(22) PCT Filed: Feb. 22, 2007

(86) PCT No.: PCT/US2007/062582
§ 371 (c)(1),
(2), (4) Date: Jul. 7, 2010

(87) PCT Pub. No.: WO2008/005590
PCT Pub. Date: Jan. 10, 2008

(65) Prior Publication Data
US 2010/0290577 A1 Nov. 18, 2010

Related U.S. Application Data

(60) Provisional application No. 60/775,736, filed on Feb. 22, 2006.

(51) Int. Cl.
*G21C 15/28* (2006.01)
*G21C 1/01* (2006.01)
*G21C 15/00* (2006.01)
*G21C 1/00* (2006.01)

(52) U.S. Cl.
USPC ........... 376/361; 378/207; 378/210; 378/211; 378/347; 516/9; 516/20; 516/31; 516/32; 516/901; 977/700; 977/832; 977/833; 977/902

(58) Field of Classification Search
USPC ......... 376/207, 210, 211, 243, 244, 277, 278, 376/280, 282, 305, 306, 327, 328, 329, 347, 376/361, 366, 370–380; 516/9, 20, 31, 32, 516/33, 901; 422/1, 7; 977/700, 832, 833, 977/902; 252/70, 71, 73
See application file for complete search history.

(56) References Cited

U.S. PATENT DOCUMENTS 3,287,229 A 11/1966 Martin
6,432,320 B1 * 8/2002 Bonsignore et al. ............ 252/70
(Continued)

FOREIGN PATENT DOCUMENTS

DE 30 09 120 A1 10/1981
FR 1 370 846 A 8/1964
GB 1 309 883 A1 3/1973

OTHER PUBLICATIONS

International Preliminary Search Report on Patentability for co-pending, related PCT Application No. PCT/US2007/062582, mailed Jan. 25, 2008.

*Primary Examiner* — Bernarr Gregory
(74) *Attorney, Agent, or Firm* — Thomas | Horstemeyer, LLP.

(57) ABSTRACT

A pressurized water nuclear reactor (PWNR) includes a core having a containment shield surrounding a reactor vessel having fuel assemblies that contain fuel rods filled with fuel pellets, and control rods, and a steam generator thermally coupled to the reactor vessel. A flow loop includes the steam generator, a turbine, and a condenser, and a pump for circulating a water-based heat transfer fluid in the loop. The heat transfer fluid includes a plurality of nanoparticles having at least one carbon allotrope or related carbon material dispersed therein, such as diamond nanoparticles.

10 Claims, 11 Drawing Sheets

(56) References Cited

U.S. PATENT DOCUMENTS

| | | | |
|---|---|---|---|
| 6,695,974 B2 * | 2/2004 | Withers et al. | 252/70 |
| 6,724,854 B1 * | 4/2004 | Kim et al. | 376/306 |
| 6,793,883 B2 * | 9/2004 | Andresen et al. | 376/306 |
| 7,264,770 B2 * | 9/2007 | Andresen et al. | 376/306 |
| 7,649,024 B2 * | 1/2010 | Li et al. | 516/33 |
| 7,820,066 B2 * | 10/2010 | Jeffcoate et al. | 252/71 |

\* cited by examiner

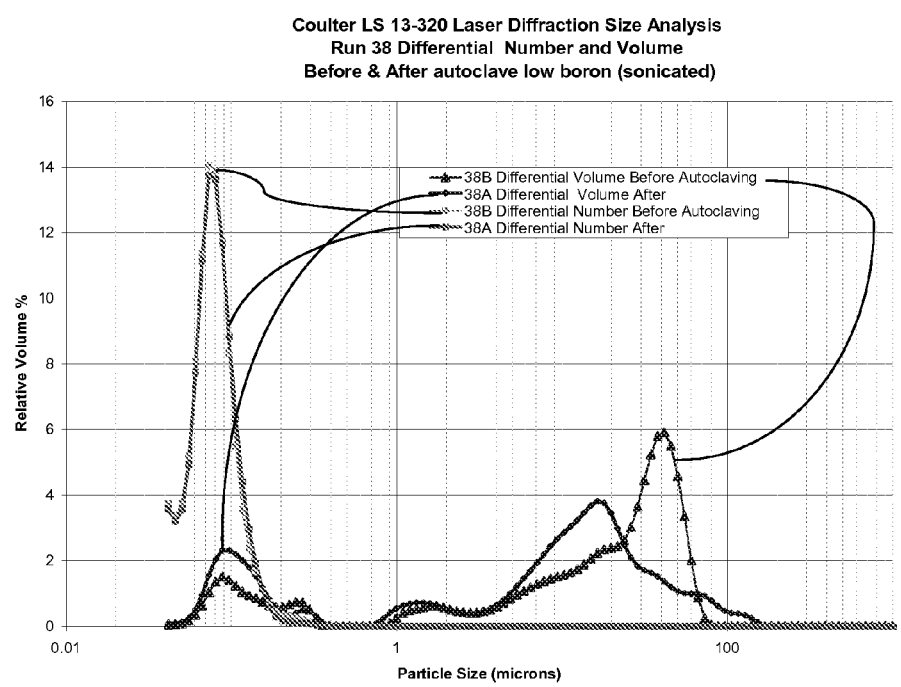
FIG. 2: Low Boron 24 hour run. Coulter Volume and Number Distributions for 1 wt% diamond in low boron content) EOC water. After = 24 hour autoclave at 275C/2500psi.

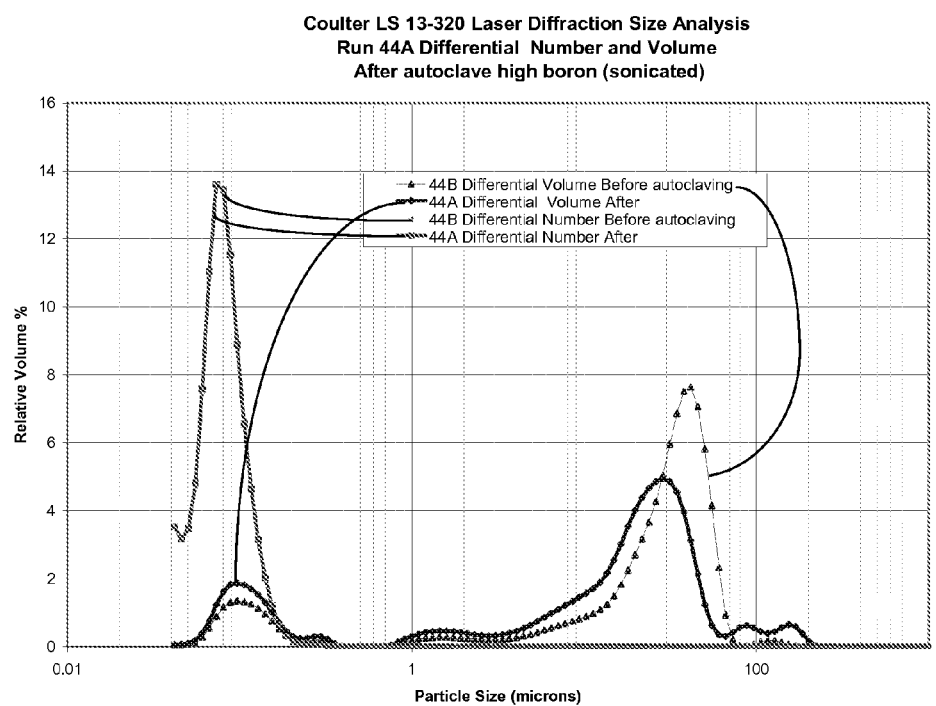
FIG. 3: High Boron 24 hour run. Coulter Volume and Number Distributions for 1 wt% diamond (high boron content) in simulated BOC water. After = 24 hour autoclave at 275C/2500psi.

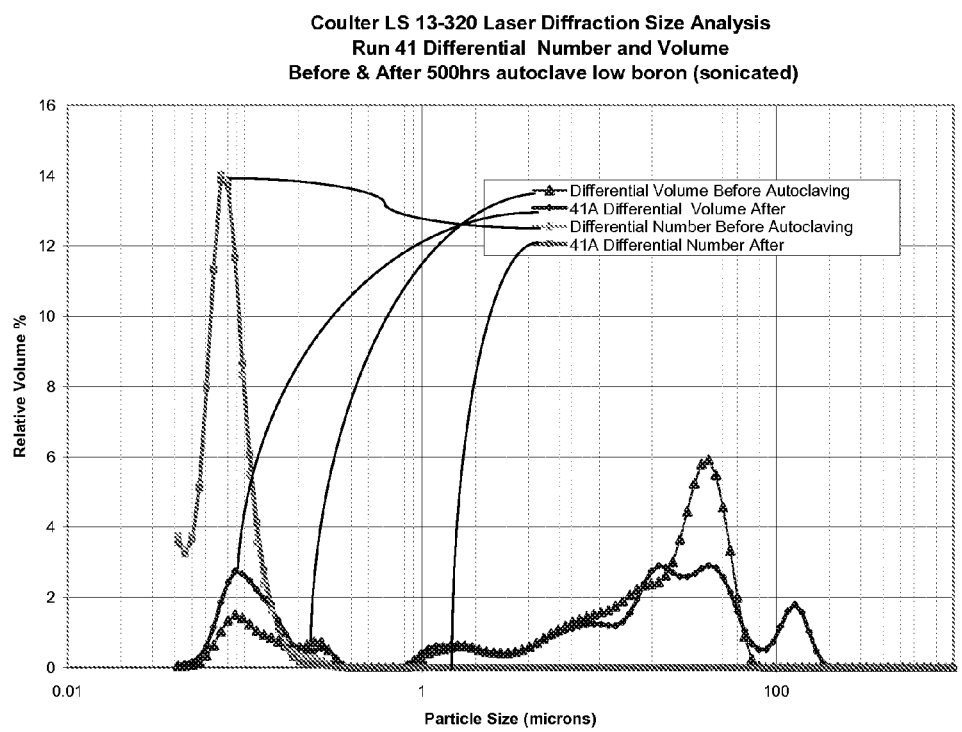
FIG. 4: Low Boron 500 hour run. Coulter Volume and Number Distributions for 1 wt% diamond (high boron content) in simulated BOC water. After = 24 hour autoclave at 275C/2500psi.

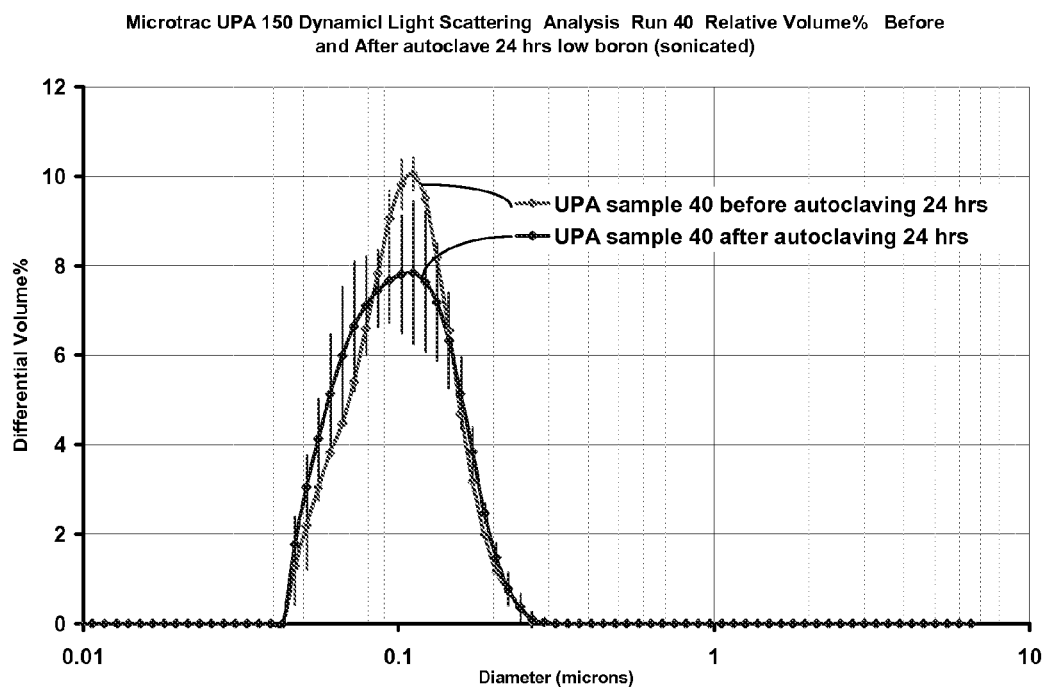
FIG. 5: Low Boron 24 hour run. Coulter Volume and Number Distributions for 1 wt% diamond in (low boron content) EOC water. After = 24 hour autoclave at 275C/2500psi.

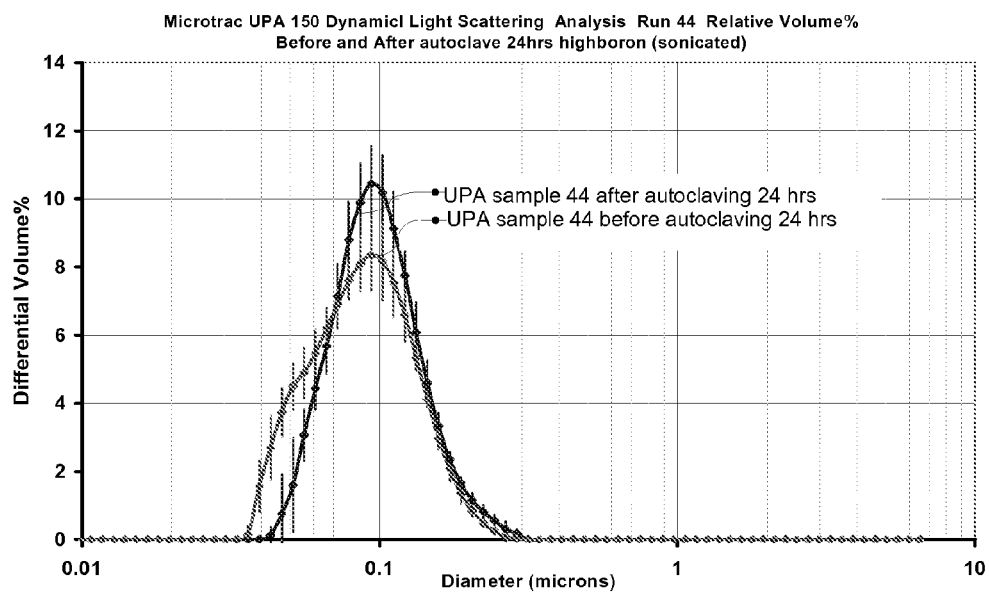
FIG. 6: UPA High Boron 24 hour run. UPA 150 Volume Distributions for 1 wt% diamond (high boron content) in simulated BOC water. After = 24 hour autoclave at 275C/2500psi.

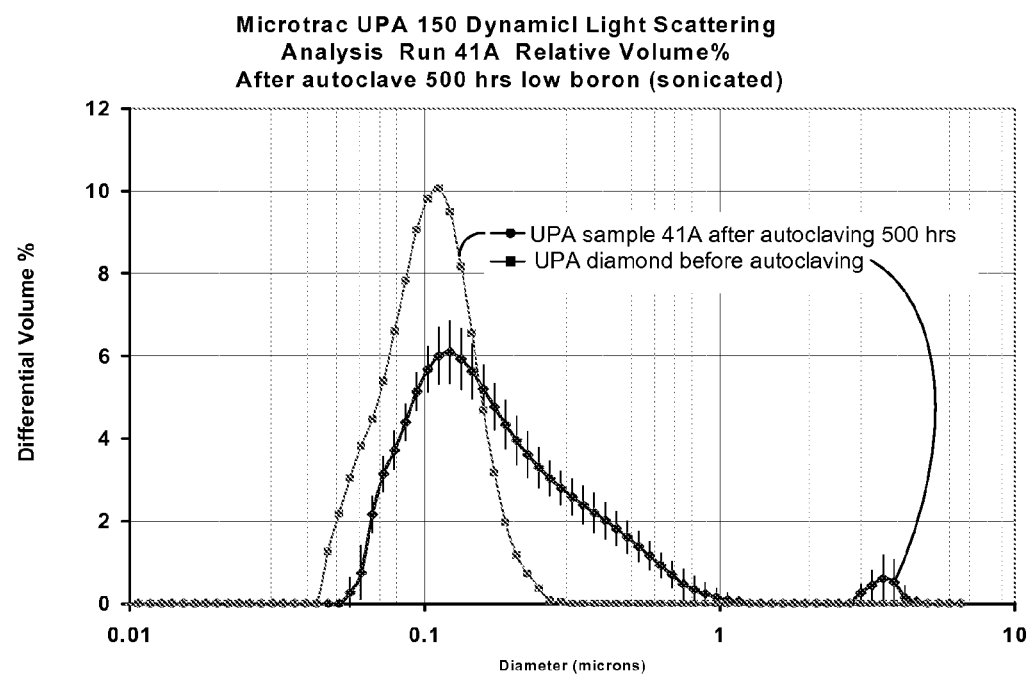
FIG. 7: Low Boron 500 hour run. UPA Volume Distribution for 1 wt% diamond (low boron content) in simulated BOC water. After = 500 hour autoclave at 275C/2500psi.

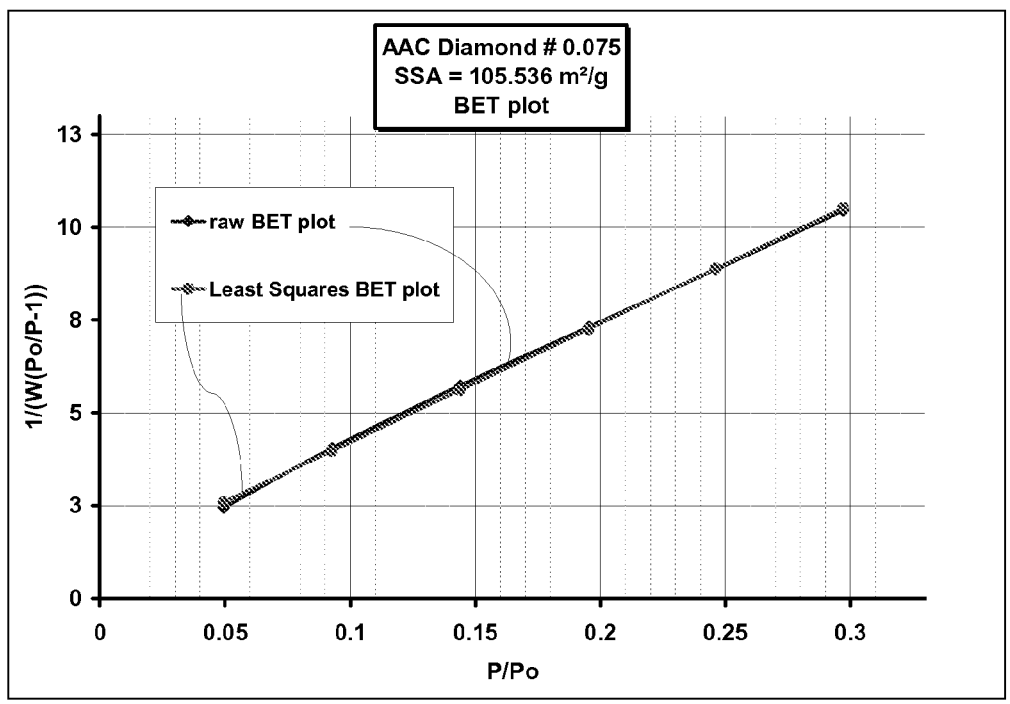
FIG. 8: Bet Plot for 75 nm as-received diamond.

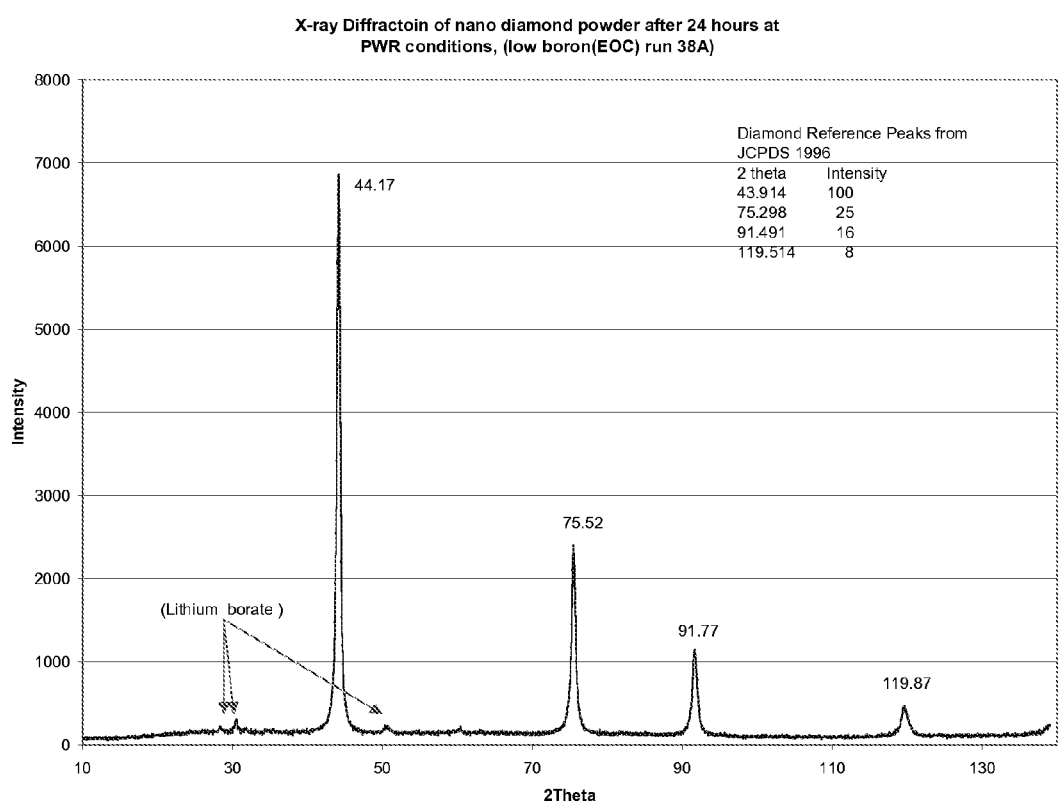
FIG. 9: XRD Low Boron 24 hour autoclave run on diamond. Note small residual Lithium borate peaks. (Powder dried but not rinsed).

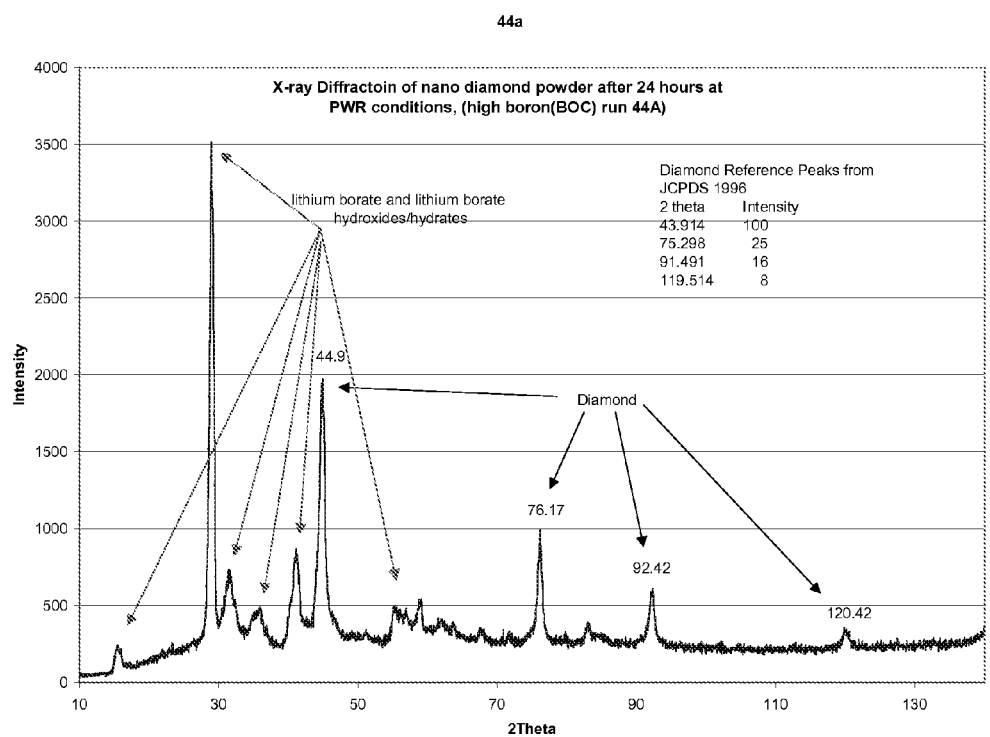
FIG. 10: XRD High Boron 24 hour autoclave run on diamond. Note many Lithium borate/lithium borate hydroxide/hydrate peaks. (Powder dried but not rinsed).

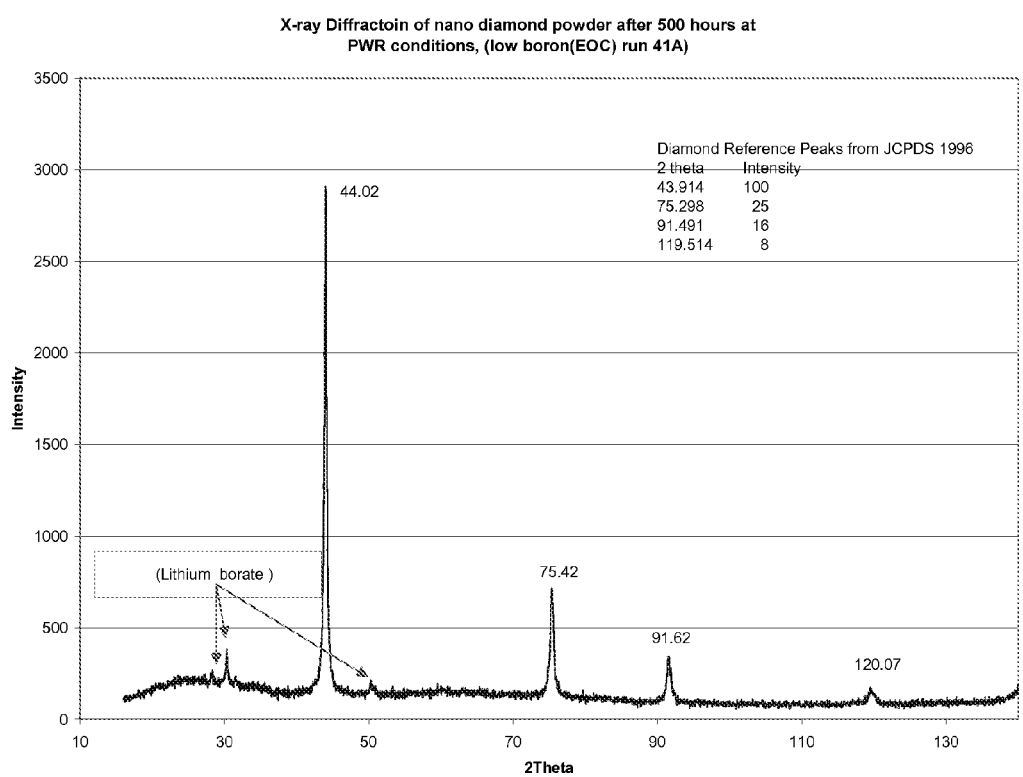
FIG. 11: XRD low Boron 500 hour autoclave run on diamond. Note small Lithium borate. (Powder dried but not rinsed).

NUCLEAR REACTOR HAVING EFFICIENT AND HIGHLY STABLE THERMAL TRANSFER FLUID

CROSS-REFERENCE TO RELATED APPLICATIONS

This application is a §371 national stage entry of International Application No. PCT/US2007/062582, filed Feb. 22, 2007, which claims priority to U.S. Provisional Application No. 60/775,736, filed Feb. 22, 2006, both of which are hereby incorporated by reference.

FIELD OF THE INVENTION

The invention relates to Pressurized Water Nuclear Reactors (PWNR) utilizing heat transfer fluids having nanoparticles dispersed therein for enhanced thermal transfer.

BACKGROUND

A pressurized water Nuclear reactor (PWNR) has a core immersed in water in a large steel tank. The fuel rods and control rods make up a vertical array. The control rods are movable, and are pulled up above the fuel rods when the plant is in full operation. The purpose of the control rods is to absorb neutrons which trigger the splitting of atomic nuclei in the fissionable material in the fuel rods. With all the control rods inserted, there is negligible fission (and heating) in the fuel rods. When the control rods are pulled out the fuel rods heat the water, which is circulated by pumps in the primary or, inner loop, to a heat exchanger.

A feature of this design is that only the water in the inner loop is in contact with the radioactive fuel rods. Thus, only the inner loop has contamination from the inevitable small amount of rust and corrosion. There are filters in this inner loop to capture the small particles which are radioactively contaminated. There are additional pumps to circulate cooling water through the core, which form the Emergency Core Cooling System (ECCS). It is essential that circulation be maintained to carry heat away from the fuel rods to prevent them from melting in the event that the main primary circulation pumps should fail. The water in the tank and the primary circulation loop is never supposed to boil, and thus always remain as water because steam is a much poorer conductor of heat as compared to water. The fuel rods are supposed to always stay under water. To prevent boiling, the tank and primary loop are maintained at very high pressure.

The secondary loop water is heated through a heat exchanger with the primary loop. Water in the secondary loop is allowed to boil in a steam generator tank. The steam is used to drive a turbine which turns an electrical generator. The residual steam is condensed back to water, which is pumped back through the heat exchanger again to make more steam. Also, circulation usually through a large cooling tower which is used to remove the waste heat.

One problem with conventional thermal transfer fluids used in PWNRs is the onset of a heat transfer condition that can lead to a departure from nuclei boiling (DNBR) that occurs at a condition call the critical heat flux. (CHF) which results in a blanketing of the fuel rod with bubbles that interferes with heat transfer and leads to a condition called dryout that can result in a critical failure of the fuel rods. What is needed is nanofluid having enhanced thermal transfer and stability for PWNRs to raise the heat flux level at which dryout condition will occur. This heat flux level is called the critical heat flux (CHF).

SUMMARY

A pressurized water nuclear reactor comprises a core comprising a containment shield surrounding a reactor vessel having fuel assemblies that contain fuel rods filled with fuel pellets and control rods, and a steam generator thermally coupled to the reactor vessel. A flow loop comprises the steam generator, a turbine, and a condenser, and a pump for circulating a water-based heat transfer fluid in the loop. The heat transfer fluid comprises a plurality of nanoparticles comprising at least one carbon allotrope or related carbon material dispersed therein. As used herein, the phrase "carbon allotrope or related carbon material" includes the carbon allotropes, such as diamond, graphite, lonsdaleite, fullerenses including C60, C540 and C70, amorphous carbon and carbon nanotube, and related materials including pyrolitic carbon, carbon black and diamond-like carbon. In some cases the allotrope or related material is functionalized, such as hydoxy-functionalized fullerenes to promote dispersion in solution.

The diamond particles are typically primarily colloidal and have a mean size of 0.5 nm to 200 nanometers. In other embodiments of the invention the mean particle size is 1 nm to 100 nm, such as 40 nm to 100 nm. A concentration of nanoparticles can range from 0.0001 to 10 volume percent of the heat transfer fluid, such as from 0.1 to 3 volume percent of the heat transfer fluid.

A method of transferring heat using a heat transfer fluid comprises the steps of providing a water based heat transfer fluid comprising a plurality of carbon allotrope or related carbon material dispersed therein, placing the heat transfer fluid in a system comprising a coolant loop including a heat source and a heat sink, and circulating the heat transfer fluid in the coolant loop during operation of the system. The system can comprise a pressurized water nuclear reactor.

BRIEF DESCRIPTION OF THE DRAWINGS

A fuller understanding of the present invention and the features and benefits thereof will be obtained upon review of the following drawings:

FIG. 2 shows particle size data for diamond particle samples dispersed in the simulated water chemistry under low boron conditions, shown before and after 24 hour autoclave at 275 C/2500 psi.

FIG. 3 shows particle size data for 1 wt % diamond (high boron content) in simulated BOC water. Before and after 24 hour autoclave at 275 C/2500 psi.

FIG. 4 shows particle size data for 1 wt % diamond in low boron content) EOC water. Before and after 24 hour autoclave at 275 C/2500 psi.

FIGS. 5 and 6 show particle size data for 1 wt % diamond (high boron content) in water before and after 24 hour autoclave at 275 C/2500 psi on the diamond powder at low boron (EOC) and high boron (BOC) concentrations, respectively.

FIG. 7 shows particle size data for 1 wt % diamond (high boron content) in water before and after a 500 hour run at EOC conditions, the data suggesting that there may be some tendency to agglomerate at longer exposure periods.

FIG. 8 shows a typical BET straight line plot for as-received diamond powder.

FIG. 9-11 show the as-received powder (dried but not rinsed), 24 hour low boron autoclaved diamond, and the 500 hour low boron autoclaved diamond, respectively.

DETAILED DESCRIPTION OF THE INVENTION

Figure 1:
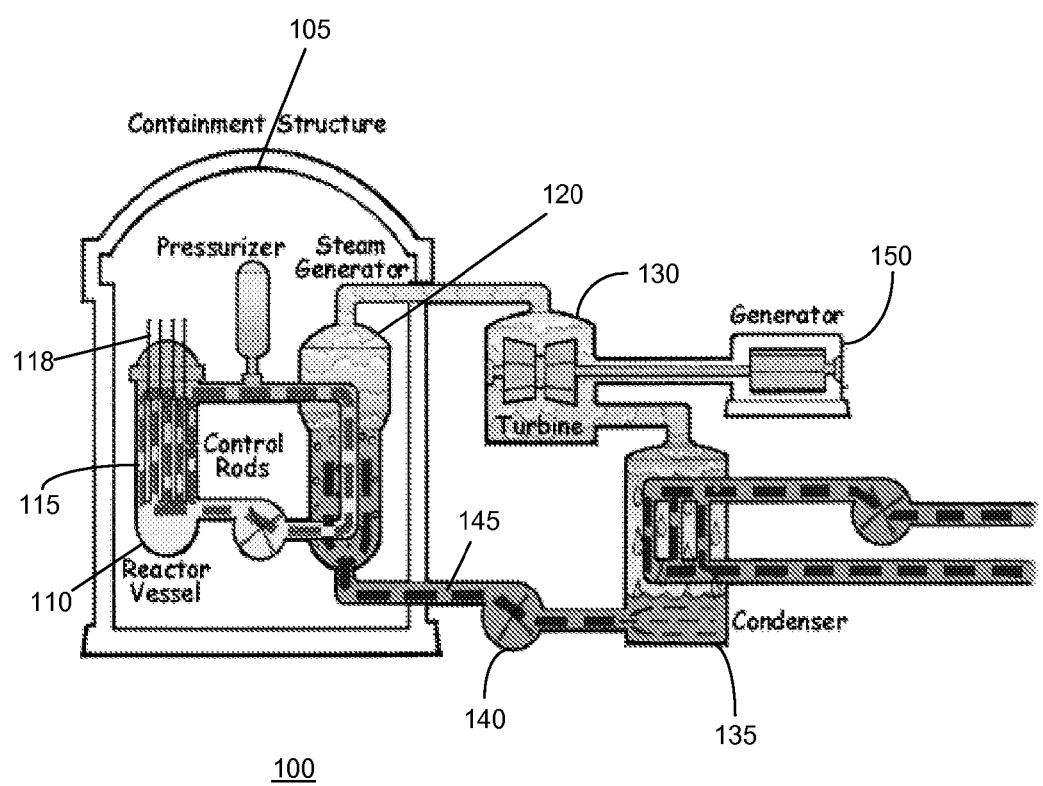
FIG. 1 shows the schematic of an exemplary pressurized water nuclear reactor that can be used with the present invention.

A pressurized water nuclear reactor (PWNR) 100 comprises a core including a containment shield 105 surrounding a reactor vessel 110 having fuel assemblies that contain fuel rods filled with fuel pellets 115, and control rods 118, and a steam generator 120 thermally coupled to the reactor vessel 110. A flow loop includes the steam generator 120, a turbine 130, a condenser 135, and a pump 140 for circulating a water-based heat transfer fluid 145 in the loop. The heat transfer fluid 145 comprises a plurality of carbon allotrope or related carbon nanoparticles, such as diamond nanoparticles, dispersed therein. The turbine 130 is shown coupled to an electrical generator 150.

Carbon allotropes are the different molecular configurations (allotropes) that pure carbon can take. The eight known allotropes of carbon include diamond, graphite, lonsdaleite, C60, C540, C70, amorphous carbon and carbon nanotube. Related essentially pure carbon related materials include pyrolitic carbon, carbon black, diamondoids (adamantames) and diamond-like carbon. The present Inventors have found carbon allotrope and related carbon materials provide low neutron cross sections, stability under typical pressures and temperatures present in core of PWNR reactors, chemical stability in the chemical environment of a PWNR, and ability to remain dispersed in the heat transfer solution under typical pressure and temperature conditions.

The carbon allotrope or related carbon material are preferably colloidal nanoparticles having a mean size of 0.5 nm to 200 nm, and are generally referred to herein as nanoparticles for convenient reference. The concentration of nanoparticles generally ranges from 0.0001 to 10 volume percent, such as 0.001, 0.01, 0.1, or 1%, of the total heat transfer fluid. The nanoparticles can be natural or synthetic, such as synthetic diamonds in the case of diamonds.

Although the Examples provided herein relate only to stability of heat transfer fluids according to the invention, tests carried out indicate that inventive heat transfer fluids can defer the critical heat flux by up to about 50%. Thermal conductivity for heat transfer fluids according to the invention are also expected to be about 150% over conventional PWNR water.

Other notable features regarding allotropic carbon or related carbon comprising nanoparticle comprising thermal transfer fluids according to the invention include:

a.) Toleration of extreme environments:
  i. Temperatures ranging from the solidification point of the base fluid to the supercritical point of the base fluid;
  ii. Pressures ranging from 1-10,000 psi;
  iii. Flow rates ranging from 0-10 m/s; and
  iv. Radioactive environment such as the core of a Pressurized Water Nuclear Reactor.
b.) Both nanoparticle size and concentration can be low enough to render the heat transfer fluid non-abrasive to the components of the application, including but not limited to PWNR components such as pumps, Zircaloys (a group of high-zirconium alloys), stainless steel piping, etc. Non-abrasive, as used herein, refers to no detection of erosion debris after 6 months (or more) under simulated reactor conditions.
c.) The low neutron capture capability provided allows application in the core of a PWNR which decreases the critical heat flux (CHF) in a PWNR.

EXAMPLES

It should be understood that the examples described below are provided for illustrative purposes only and do not in any way define the scope of the invention. For example, although the Examples all utilize diamond nanoparticles, as noted above the dispersed nanoparticles can be any of the carbon allotropes or related carbon materials.

The present Inventors determined that the extent to which nanoparticles retain their size following exposure to PWNR autoclave conditions can provide a measure of particle stability in a nuclear reactor environment. The effect of 24 hours under simulated PWNR conditions on particle size was evaluated. Particle size distributions were first collected for all samples prior to the autoclave runs. The samples were then taken to the autoclave, and were run at approximately 630° F. and 2500 psi for 24 hours. The composition of the low boron samples for all experiments described below was 1.6 ppm LiOH and 42.7 ppm boric acid. The composition of the high boron samples for all experiments described below was 1.6 ppm LiOH and 1400 ppm boric acid.

A. Beckman-Coulter LS13320:

A Beckman-Coulter LS13320 laser diffraction size analyzer was used to investigate the effect of PWNR conditions on particle size distribution. The laser diffraction size analyzer utilizes a laser diffraction method for analyzing particle size distribution and measures particle sizes from 40 nm to 2,000 μm. Advantages of laser diffraction include simplicity of operation, a built in mixer to keep particles dispersed and a broad dynamic size range encompassing the nano region from 40 nm up through 2 millimeters. Thus both primary particles and agglomerates can be observed simultaneously giving an indication of the relative state of agglomeration. FIG. 2 shows the volume distribution of the as received diamond particle samples dispersed in the simulated water chemistry of beginning of cycle reactor fluid. Conditions were low boron conditions comprising 1.6 ppm LiOH and 42.7 ppm boric acid and a pH of 6.9.

The volume plot shown in FIG. 2 indicates that only 20% of the diamond nanoparticles were well dispersed before autoclaving and this proportion appeared to increase slightly after PWNR conditions. There was also some growth in size of agglomerates in all runs. In both cases, the dispersed diamond fraction maintained a consistent size (number basis) in the vicinity of 75 nanometers (0.075 μm). The results were similar for the high boron (beginning of cycle shown in FIG. 3) water chemistry and for the 500 hour low boron diamond run shown in FIG. 4.

B. Microtrac UPA 150

A Microtrac UPA 150 was used to better characterize particle size distributions in the nanometer range. The UPA 150 (Ultra-fine Particle Analyzer) is a dynamic light scattering method, and provides particle size and the size distribution from approximately 0.003 μm to 6.54 μm. The Microtrac is designed to quantify nanoparticle dispersions only up to a few microns and therefore cannot detect the fraction of large agglomerated material, which settles rapidly out of the detection volume in the unstirred 20 ml sample cell. Thus it provides a good representation of the dispersed fraction of material.

FIGS. 5 and 6 represent UPA 150 volume distributions for 1 wt % diamond (high boron content) in water after =24 hour autoclave at 275 C/2500 psi on the diamond powder at low boron (EOC) and high boron (BOC) concentrations, respectively. The results are consistent with the laser diffraction data and show a low tendency towards agglomeration. FIG. 7 shows UPA 150 volume distributions for 1 wt % diamond (high boron content) in water before and after a 500 hour run at EOC conditions which suggests that there may be some tendency to agglomerate at longer exposure periods. However, the reactor used for the tests was a static reactor with no stirring or circulation to promote dispersion agglomeration. Accordingly, agglomeration can likely be significantly reduced by including the reactor with a means for stirring or circulation to promote dispersion.

C. BET Surface Area:

A Brunauer-Emmett-Teller (BET) surface area analyzer estimates the specific external surface of a solid by determining the volume of a specific gas that is absorbed under controlled conditions. BET surface area was measured using a Quantachrome NOVA 1200 Surface Area Analyzer to analyze any changes in specific surface area in diamond due to 24 hours at PWNR conditions. This instrument performs rapid and accurate sorption measurements of nitrogen gas on particle surfaces to directly measure surface area. Prior to gas adsorption, the powder sample was degassed and dried in a vacuum at a temperature of 180° C. Measurements made by this instrument include multipoint BET method surface area, single point BET surface area, 25 point adsorption isotherms, 25 point desorption isotherms, total pore volume, average pore radius, and BJH pore size distribution based on the adsorption or desorption isotherm. FIG. 8 shows a typical BET straight line plot for as-received diamond powder. Table 1 (below) shows BET data for the 24 hour autoclave runs and the single 500 hour autoclave run on the diamond sample. BET surface area measurements are normally reproducible to within 5%. The data in table one indicates some degradation of surface area after autoclaving with the largest decrease (~15%) observed for the 500 hour run. The formula for calculating the geometric diameter of a sphere from the specific surface area is:

$$d_{microns} = \frac{6}{\rho(g/cm^3) \times S.S.A.(m^2/g)}$$

where d is the diameter in microns, $\rho$ is the density in $g/cm^3$ and S.S.A. For the diamond, the as-received surface area of 97.7 $m^2/g$, equates to a spherical equivalent diameter of 17.8 nanometers ($\rho=3.45$) which is far smaller than the measured mean particle size. This discrepancy is consistent with the large relatively hard agglomerates which are made up of the primary nanoparticles. These provide microporous interparticle spacing in which the nitrogen can condensed during analysis. In addition, the manufacturer has indicated that the particles are engineered with surface features (microcracks) that may enhance nitrogen adsorption. The bulk of the decrease in surface area for the 500 hour runs is likely to occur inside these diamond agglomerates.

TABLE 1

BET surface area for diamond runs.

| Sample ID | BET Surface area | Correlation |
|---|---|---|
| As Received Diamond | 105.5 | .9980 |
| As Received Diamond | 90.1 | .9998 |
| 44 (high boron) Before autoclaving (as received) | 105.8 | .9998 |

TABLE 1-continued

BET surface area for diamond runs.

| Sample ID | BET Surface area | Correlation |
|---|---|---|
| 38 (low boron) After autoclaving 24 hrs | 98.28 | .9990 |
| 39 (low boron) After autoclaving 24 hrs | 103.0 | .9953 |
| 40 (low boron) After autoclaving 24 hrs | 87.5 | .9999 |
| 41 (low boron) After autoclaving 500 hrs | 85.8 | .9991 |
| 44 (high boron) After autoclaving 24 hrs | 104.4 | .9998 |

D. Zeta Potential Brookhaven Instruments

The zeta potential of the nanoparticulates was measured by the electrophoretic mobility method using photon correlation spectroscopy. For most ensemble size measurements techniques what is really measured is the agglomerate size distribution. Thus, the size distribution is highly dependent on the state of dispersion of the system. Any ensemble particle size measurement must be interpreted in this context. Due to attractive forces (Van der Waals, and other), particles will tend to agglomerate in suspension unless stabilized by surface charge or steric effects. Most aqueous suspensions of hydrophilic powders will specifically adsorb or desorb hydrogen ions to generate a surface charge. Homogeneous powders that develop a surface charge high enough to overcome interparticle attraction will form more stable dispersions. The point of zero charge is approximated by measuring the isoelectric point—that is, the pH at which the zeta potential is zero. The pH at which this occurs is material dependent. For a native diamond oxide surface the isoelectric point tends to be low. The charge is more positive as the pH (acidic solutions) decrease below the isoelectric point and more negative as the pH rises above the IEP. The closer the pH is to the isoelectric point the greater the tendency for the material to agglomerate. Table 2 shows the zeta potential for the diamond both before and after autoclave treatment. In general the diamond displays a relatively high negative zeta potential under all conditions tested. The zeta potential was significantly lower in the high boron containing sample (BOC) to the higher ionic strength of the solution (10 times greater than EOC samples). This is expected, as high ionic strength tends to suppress the double layer and reduce the zeta potential. The zeta potential was the highest for the 500 hour autoclave (EOC conditions) run. This bodes well for the stability of diamond nanopowder dispersions under these conditions.

TABLE 2

Zeta potential measurements for diamond runs before and after autoclaving.

| Sample | Zeta Potential (mV) | Standard Error | pH |
|---|---|---|---|
| 24 hour Low Boron (before) | −34.11 | 0.82 | 6.7-6.8 |
| 24 hour Low Boron (after) | −28.9 | 0.87 | 6.75 |
| 24 hour High Boron #44 (before) | −16.16/−24.9 | 1.05/ | 6.82 |
| 24 hour High Boron #44 (after) | −20.8 | 1.75 | 6.82 |
| 500 hour Low Boron #41(before) | −28.85 | 0.92 | 6.73 |
| 500 hour Low Boron #41(after) | −26.25 | 0.83 | 6.76 |
| 500 hour Low Boron #41(after) | −39.5 | 1.09 | 6.8 |

E. JEOL 3035 Field Emission SEM and JEOL-2010F Scanning TEM:

Diamond surface morphology was examined using both SEM and TEM. Scanning electron microscopy revealed very large particles appearing to be fractured bulk material. Further testing, discussions with the manufacturer and TEM indicated that these particles actually were hard porous agglomerates of the about 75 nm average primary particles. The fracture surfaces most likely are the results of the manufacturer grinding the pan dried nanomaterial for packaging. These agglomerates were impossible to redisperse in their entirety. High energy sonication produced an average of 20% dispersion (by mass) into the desired nano particle size. The remaining 80% stayed agglomerated even through simulated PWNR conditions.

TEM analysis was performed on the nanodispersed phase. Scanned images taken with TEM for a sample of diamond not exposed and after exposure to PWNR conditions. The diamond morphology did not appear to be significantly affected by exposure to PWNR conditions.

F. X-Ray Diffraction (XRD):

X-ray diffraction measurements were conducted on powders before and after autoclaving at PWNR conditions to determine if any changes could be observed in crystal structure. For the diamond, no changes were noted between the as received and post treatment samples. FIGS. 9-11 show the as-received powder (dried but not rinsed), and the 500 hour low boron autoclaved diamond, respectively. The powders were dried and analyzed directly from the reactor water without rinsing to avoid loss of potential nanoparticulate phases. Consequently, crystallized soluble (lithium borate hydrates) species are apparent in spectra, particularly the high boron (BOC) samples. No graphitic peaks ($2\theta=26.53/100$, $44.63/50$, $54.70/80$) or other carbon phases were observed.

G. FTIR and RAMAN Spectroscopy:

In addition, the three diamond samples were analyzed with FTIR and with RAMAN spectroscopy. These instruments can be used to identify differences in the functional groups present on the surface and in the bulk for many materials including gases, liquids, solids, fibers, and thin films.

RAMAN was used to observe changes in the surface chemistry of the material during the autoclave run. Micro-RAMAN spectra obtained evidenced how little the Raman spectra changes during the low boron autoclave run. The RAMAN intensities are quite low, and the peaks are not sharp. However, there appears to be little change after exposure to PWNR conditions. These are typical results for the low boron runs. RAMAN was not performed on the high boron or 500 hour runs.

The FTIR spectra of these powders gives a better indication of the surface composition of the nano diamond powders. A diffuse reflectance sampling apparatus (Gemini, Spectra Tech) was used to maximize the amount of surface information. The spectra of the initial powder and that of the three low boron replicates prior to autoclaving were obtained. (Thus the powder was suspended, then dried at about 100 degrees Celsius for about 1 h. It was diluted with dry potassium bromide at about 1 weight percent prior to analysis.) These powders all exhibited peaks in the 3700-2700 $cm^{-1}$ range typically associated with hydroxyl bonds. There is a strong peak at about 1720 $cm^{-1}$ which (along with others) indicates the presence of carboxylic acid groups. The peak at about 1615 $cm^{-1}$ is probably due to aromatic carbon-carbon double bonds. In short, the features shown are typical of a partially oxidized carbon surface.

The FTIR spectra for the nanodiamond powder do show some minor differences after exposure to PWNR conditions. The IR spectra of the nanodiamond powder (EOC) dried from solution both before and after exposure in the autoclave revealed several differences. The hydroxyl peak (about 3000-3700 $cm^{-1}$) is slightly reduced in intensity and the CH stretching peaks around 2800-3000 $cm^{-1}$ increase in intensity. Small peaks at about 1520 and 760 $cm^{-1}$ also form.

The results disclosed above indicate that the diamond comprising thermal transfer system provides a high level of dispersion stability. Chemical stability of the diamond appears excellent, although higher quality diamond nanopowders may provide even better results. All nanopowders are preferably obtained in an aqueous dispersed state when possible. The dispersion stability of diamond also appears quite good.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The invention claimed is:

1. A pressurized water nuclear reactor, comprising:
a core comprising a containment shield surrounding a reactor vessel having fuel assemblies that contain control rods and fuel rods filled with fuel pellets, and a steam generator thermally coupled to said reactor vessel via a primary flow loop;
a secondary flow loop comprising said steam generator, a turbine, a condenser, and a pump for circulating a water-based heat transfer fluid in said secondary flow loop, wherein said heat transfer fluid comprises a plurality of nanoparticles comprising at least one carbon allotrope or related carbon material dispersed therein.

2. The pressurized water nuclear reactor of claim 1, wherein said at least one carbon allotrope or related carbon material comprises diamond nanoparticles.

3. The pressurized water nuclear reactor of claim 2, wherein said diamond nanoparticles are primarily colloidal.

4. The pressurized water nuclear reactor of claim 2, wherein said diamond nanoparticles have a mean size that is in a range from 0.5 nm to 200 nanometers.

5. The pressurized water nuclear reactor of claim 4, wherein said mean size is in a range from 1 nm to 100 nm.

6. The pressurized water nuclear reactor of claim 4, wherein said mean size of said plurality of nanoparticles is in a range from 40 nm to 100 nm.

7. The pressurized water nuclear reactor of claim 1, wherein said at least one carbon allotrope or related carbon material comprises fullerenes.

8. The pressurized water nuclear reactor of claim 1, wherein said at least one carbon allotrope or related carbon material comprises carbon nanotubes.

9. The pressurized water nuclear reactor of claim 1, wherein a concentration of said plurality of nanoparticles in said heat transfer fluid is in a range from 0.0001 to 10 volume percent of said heat transfer fluid.

10. The pressurized water nuclear reactor of claim 9, wherein said concentration of said plurality of nanoparticles in said heat transfer fluid is in a range from 0.1 to 3 volume percent of said heat transfer fluid.

* * * * *

UNITED STATES PATENT AND TRADEMARK OFFICE
CERTIFICATE OF CORRECTION

PATENT NO.       : 8,731,133 B2                                    Page 1 of 1
APPLICATION NO. : 12/280286
DATED            : May 20, 2014
INVENTOR(S)      : Baney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1619 days.

Signed and Sealed this
Twenty-ninth Day of September, 2015

Michelle K. Lee
*Director of the United States Patent and Trademark Office*